United States Patent
Weis

(10) Patent No.: US 7,133,359 B2
(45) Date of Patent: Nov. 7, 2006

(54) FAST RESTORATION MECHANISM AND METHOD OF DETERMINING MINIMUM RESTORATION CAPACITY IN A TRANSMISSION NETWORKS

(75) Inventor: Bernd X. Weis, Korntal (DE)

(73) Assignee: Alcatel, Paris (FR)

( * ) Notice: Subject to any disclaimer, the term of this patent is extended or adjusted under 35 U.S.C. 154(b) by 1003 days.

(21) Appl. No.: 10/106,502

(22) Filed: Mar. 27, 2002

(65) Prior Publication Data

US 2003/0067867 A1 Apr. 10, 2003

(30) Foreign Application Priority Data

Apr. 4, 2001 (DE) ................. 101 16 835
Sep. 14, 2001 (EP) ................. 01 440 302

(51) Int. Cl.
*H04L 12/437* (2006.01)
(52) U.S. Cl. .................................... 370/222
(58) Field of Classification Search ............ 370/216, 370/221, 222, 223, 224
See application file for complete search history.

(56) References Cited

U.S. PATENT DOCUMENTS

| | | | |
|---|---|---|---|
| 5,134,690 A | * | 7/1992 | Samatham .............. 710/317 |
| 5,297,137 A | | 3/1994 | Ofek et al. |
| 5,974,027 A | | 10/1999 | Chapman |
| 6,141,319 A | | 10/2000 | Dighe et al. |
| 2005/0243711 A1 | * | 11/2005 | Alicherry et al. ........... 370/216 |

FOREIGN PATENT DOCUMENTS

GB   2 327 020 A   1/1999

OTHER PUBLICATIONS

W.D. Grover et al., 'Cycle-Oriented Distributed Preconfigureation: Ring-like Speed with Mesh-like Capacity for Self-planning Network Restoration', 1998 IEEE, pp. 537-543.*
M. Alicherry et al., Pre-Provisioning Networks to Support Fast Restoration with Minimum Over-Build, IEEE INFOCOM 2004, pp. 1-11.*
Banerjee A et al: "Generalized Multiprotocol Label Switching: An Overview of Routing and Mangaement Enhancements" IEEE Communications Magazine, IEEE Service Center. Piscataway, N.J., US, vol. 39, No. 1, Jan. 1, 2001, pp. 144-150.

* cited by examiner

*Primary Examiner*—Melvin Marcelo
(74) *Attorney, Agent, or Firm*—Sughrue Mion, PLLC

(57) ABSTRACT

In order to restore a network after a failure, it is important to have sufficient spare capacity available. To ensure restorability, a Hamiltonian mesh, being a closed sequence of links traversing each network node exactly once, is determined and half of its capacity is reserved for restoration purpose. In the case of a line failure of a link other than the links of the Hamiltonian mesh, affected traffic is split in two portions and rerouted over the two directions of the Hamiltonian mesh. In the case the network has no Hamiltonian mesh, a mesh coverage is determined and sufficient spare capacity reserved for restoration purpose.

19 Claims, 8 Drawing Sheets

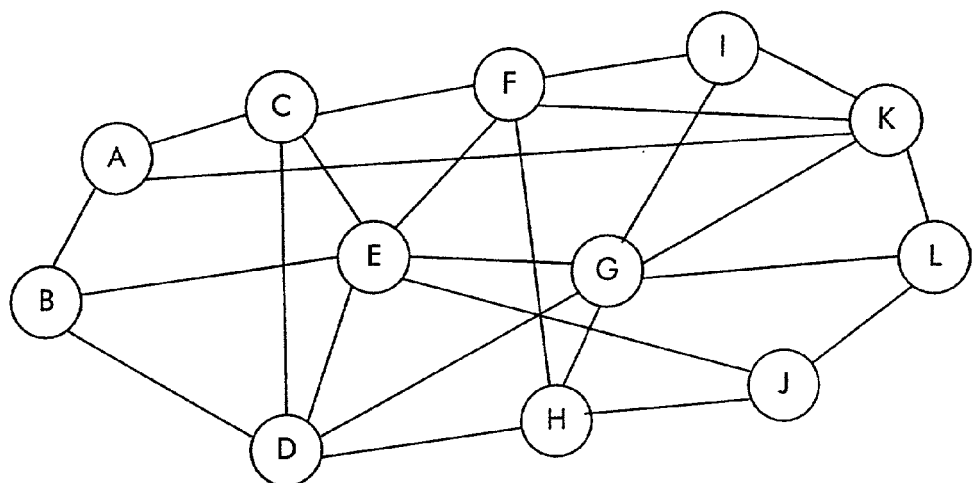
Fig. 1
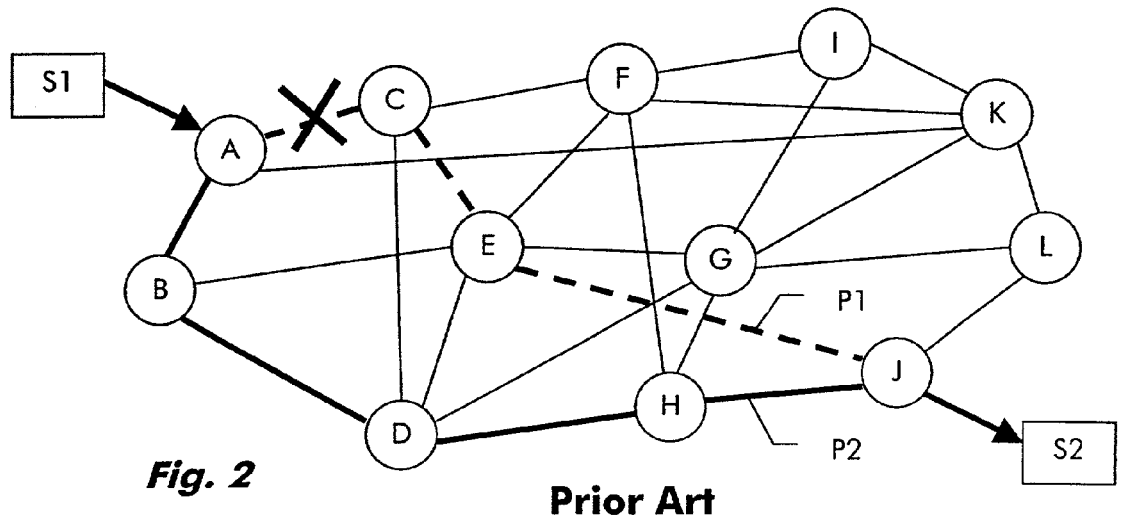
Fig. 2  Prior Art
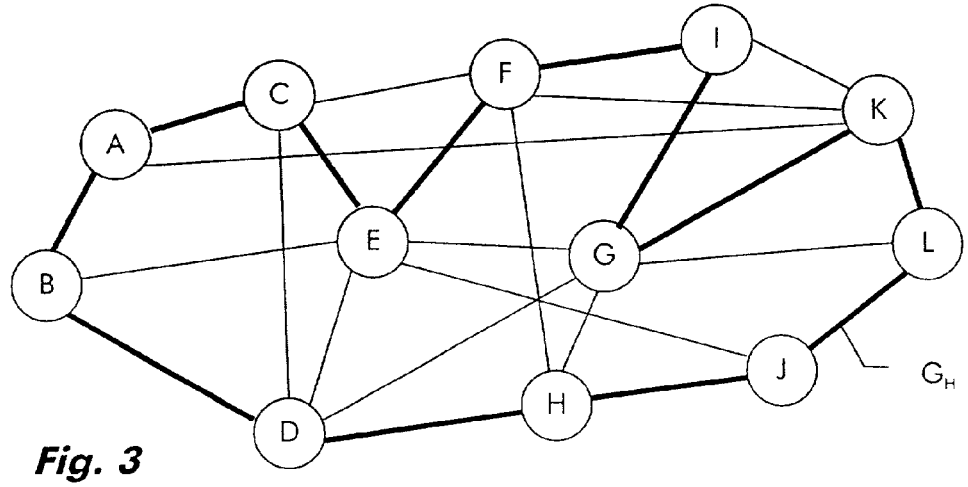
Fig. 3

FAST RESTORATION MECHANISM AND METHOD OF DETERMINING MINIMUM RESTORATION CAPACITY IN A TRANSMISSION NETWORKS

FIELD OF THE INVENTION

The invention relates to the field of telecommunications and more particularly to a method of restoring a meshed transmission network upon occurrence of a line failure. The invention also relates to a method of determining the minimum restoration capacity in a meshed transmission network and corresponding network planning tool and network management device. Furthermore, the invention relates a network element for a meshed transmission network.

BACKGROUND OF THE INVENTION

One of the very basic aspects of telecommunications networks is their availability and reliability. Hence, the operation of such a network requires a fast fix of failures by some mechanism. In local area networks (LAN) e.g., in a building or a campus, it might be sufficient to have personnel and a spare pool of equipment as due to the vicinity of the installation repairs or replacements can quickly be done.

Simply because of the geographical dimensions this is not possible or prohibitive in terms of cost in transmission networks like metropolitan or wide area networks (MANs and WANs, respectively). Hence, for these networks the network itself or the combination of network and network management needs to provide the means and facilities to ensure sufficient availability. Typically, these network mechanisms are distinguished in protection and restoration.

Protection mechanisms known from transmission systems like SDH systems (Synchronous Digital Hierarchy) require a 100% spare capacity of resources for protection in the network and provide the means for a very fast masking of the failure in terms of availability, typically in less than 50 ms.

Restoration mechanisms are more stringent in the usage of spare capacity and however, providing a masking of the failure at a lower speed, typically in the range of a few seconds as completely new paths through the network are established.

An example of restoration is shown in FIG. 2. In case of a failure of one link or node, the affected traffic is re-routed over some other links which have reserved capacity for restoration purpose. The process of re-routing the traffic affected by this failure is called path restoration as new paths are established to replace the failed ones. The time needed to restore a network distinguishes between fast restoration if all paths are restored in about or less than 10 seconds and slow restoration if all paths are restored within a few minutes. If restoration is a functionality provided by the network management it is called centralized restoration, if restoration is a functionality provided by the network itself (like for protection) it is called distributed restoration.

These mechanisms are applicable to basically any network structure—ring, mesh or hub structures or combinations thereof. However, some mechanisms are more suitable to some structure than others—basically the planning requires the specific network at hand to define the optimal configurations.

A basic problem in large networks is to determine where and how much spare capacity needs to be reserved for restoration purpose in order to ensure that any single failure in the network can be fully restored. For most of the today's networks, this has been done manually, by making assumptions and simulating any failures to see whether full restorability is achieved. However, this test has to be performed any time topological changes are made in the network, e.g., by adding or replacing single links or nodes.

SUMMARY OF THE INVENTION

It is therefore an object of the present invention, to provide a method for determining minimum restoration capacity in a network. A further object of the invention is to provide a method of fast restoring a transmission network upon occurrence of a line failure. Other objects of the invention are to provide a network element capable of fast restoration, a network planning tool for determining the minimum restoration capacity in a transmission network and a network management device capable of configuring a transmission network with minimum restoration capacity.

These and other objects that appear below are achieved by a method according to claim 1, a method according to claim 12, a network element according to claim 14, a network planning tool according to claim 13, and a network management device according to claim 15, respectively. Advantageous developments are defined in the dependent claims.

The invention has the advantages, that it allows to determine the minimum restoration capacity required to protect against any single line failures and that it provides the fastest restoration mechanism for large networks.

BRIEF DESCRIPTION OF THE DRAWINGS

Preferred embodiments of the present invention will now be described with reference to the accompanying drawings in which FIG. 1 shows a meshed network used as an example to describe the invention;

FIG. 2 shows the known principle of restoration in the network of FIG. 1;

FIG. 3 shows a Hamiltonian mesh in the network of FIG. 1;

DETAILED DESCRIPTION OF THE INVENTION

Figure 4:
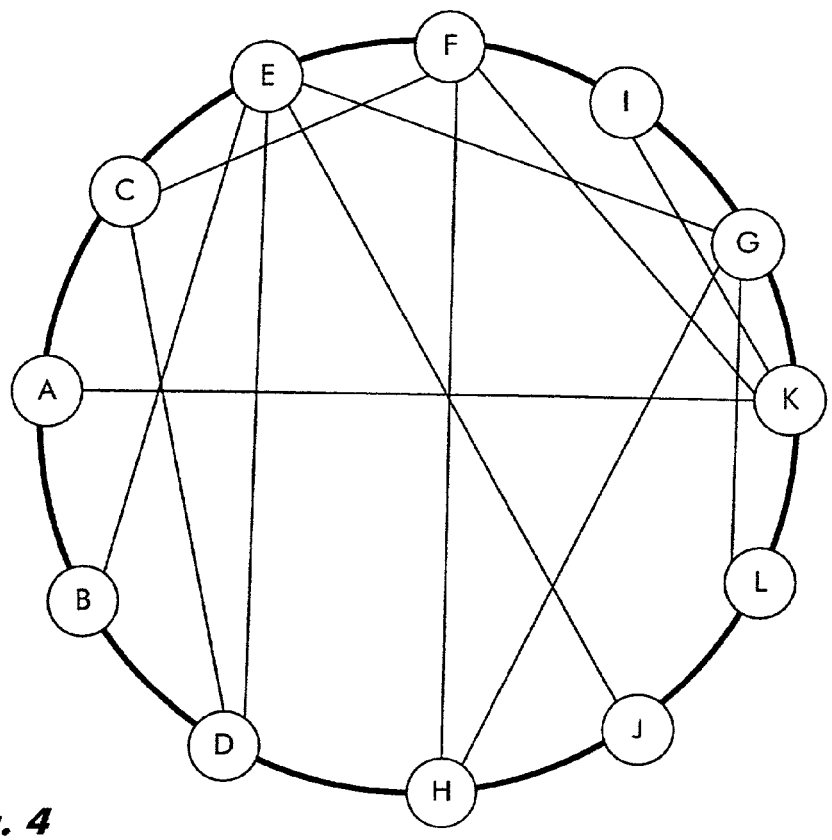
FIG. 4 shows a logical representation in the form of a ring of the network shown in FIG. 1.

The network topology that will be used as an example in the following description of the invention is shown in FIG. 1. It consists of network nodes depicted with reference signs A to L. The networks nodes are physically interconnected by transmission lines such as for example optical fibers, coax cables or microwave links. For the sake of simplicity, it is assumed in this example that all transmission lines in the network have the same total transmission capacity. It is further assumed, that each link is bi-directional. As shown in FIG. 1, the example network topology contains the following physical links: A-B, A-C, B-D, C-D, C-E, D-E, E-F, E-G, E-J, F-I, F-H, F-K, G-H, G-I, G-K, G-L, H-J, I-K, K-L, L-J. The failure type that is considered in the following is a cut of the link between two network nodes.

As mentioned above, FIG. 2 shows the principle of restoration. Data is transmitted from a source S1 to a sink S2 over a first path P1. The first path P1 is a sequence of links via nodes A, C, E, and J. Now, link A-C is interrupted due to a line failure. This failure is recovered by establishing a new path P2 via nodes A, B, D, H, and J. This implies that some spare capacity was available to establish the new path P2. As network recovery requires reconfiguration of a number of intermediate nodes, this is a slow process. However, as explained previously, it is difficult to determine in advance the amount of spare capacity that is required to allow recovery of any possible failure.

At first, some terminology will now be introduced. Conceptually the topological relationship between the nodes and links of a network can be represented by a graph G=(V, A) where V is the set of nodes, #V in number and A is the set of arcs which interconnect the nodes, #A in number where an arc $a_i$ is defined by two nodes $O(a_i)$ and $T(a_i)$ as well as a set of arc attributes e.g. capacity, cost, etc.

The node degree of a node N is the number of links connected to N. If the total number of links and nodes is given by #A and #V, respectively, then the average node degree d of G is d=2*#A /#V as each arc is incident to two nodes.

A path between two nodes $N_1$ and $N_2$ is a sequence $b_1, \ldots, b_n$ of n arcs $a_i$ such that $O(b_1)=N_1$, $T(b_n)=N_2$, and $T(b_m)=O(b_{m+1})$, m=1, ..., n−1 and every node appears only once. With respect to the arcs of the path every node N of the path has degree 2 except nodes $N_1$ and $N_2$ which have degree 1. A mesh is a path where $N_1=N_2=N$ and node N appears twice, i.e. $O(b_1)=T(b_n)=N$. In other words, a mesh is a closed sequence of links.

Two nodes are connected if there is a path between the nodes. A graph is k-arc connected if for every partition of the node set V into non-empty sets $V_r$ and $V_l$ the removal of k-1 arcs of which one of the nodes is in $V_r$ and one in $V_l$, does not disconnect any two nodes, k-node connected if the removal of any k-1 nodes with their incident arcs does not disconnect any two nodes, k-connected if it is k-arc and k-node connected.

A cut is a partition of V into two non-empty subsets $V_r$ and $V_l$. The cut set($V_r$, $V_l$) is the set of arcs $a_i$ with one node $O(a_i) \in V_r$ and one $T(a_i) \in V_l$ or vice versa.

A Hamiltonian mesh $G_h=(V, A_h)$ of G is a mesh visiting all nodes exactly once. By definition every node of this mesh has node degree of exactly 2, i.e. the number of arcs $\#A_h$ of the mesh is exactly the number of nodes #V. In other words, a Hamiltonian mesh is a closed sequence of links traversing each node exactly once. An example of a Hamiltonian mesh is shown in FIG. 3 by bold lines.

Some basic properties of Hamiltonian meshes are that:

Hamiltonian meshes are 2-arc connected, i.e. there exist exactly two arc-disjoint paths between any two nodes;

a Hamiltonian mesh is the mesh with the least number of arcs that is 2-arc connected; and every cut set of G contains at least two arcs of the Hamiltonian mesh $G_h$.

A basic idea of the invention is thus, to find a Hamiltonian mesh in a meshed network G=(V, A) and to provide spare capacity primarily on this mesh. In the example network, a Hamiltonian mesh $G_h=(V, A_h)$ can be found as a closed sequence of links via nodes A, C, E, F, I, G, K, L, J, H, D, B and back to A.

As shown in FIG. 4, a Hamiltonian mesh can be logically represented as a ring. Any network links not part of the Hamiltonian mesh appear as intersecting links in the ring. It is important to understand, that FIG. 4 is a logical representation of the entire network, and that the network itself has actually not the form of a ring as it is intersected by the remaining links in the network not part of the mesh but protected by the mesh, which is not the case for a ring network.

In a first embodiment, it is assumed that the capacity offered by the network is fully needed to satisfy traffic requirements. Furthermore, it is assumed that for restoration purpose existing links, i.e. cables or cable ducts are extended with the means to provide this additional capacity, i.e. if a cable or cable duct is cut the restoration capacity assigned to this cable or cable duct is cut as well. Hence, the question to be answered is how much additional capacity is at least needed to ensure that traffic can be restored.

In this first embodiment of the present invention, the network G=(V, A) is extended with spare capacity by doubling the capacity of any arcs of the Hamiltonian mesh. The capacity thus augmented defines the restoration capacity. The network is now restorable in the event of any possible failure. Under the assumption made above that the non-augmented capacity is fully required to satisfy traffic requirements, this configuration provides also the minimum restoration capacity.

Figure 6:
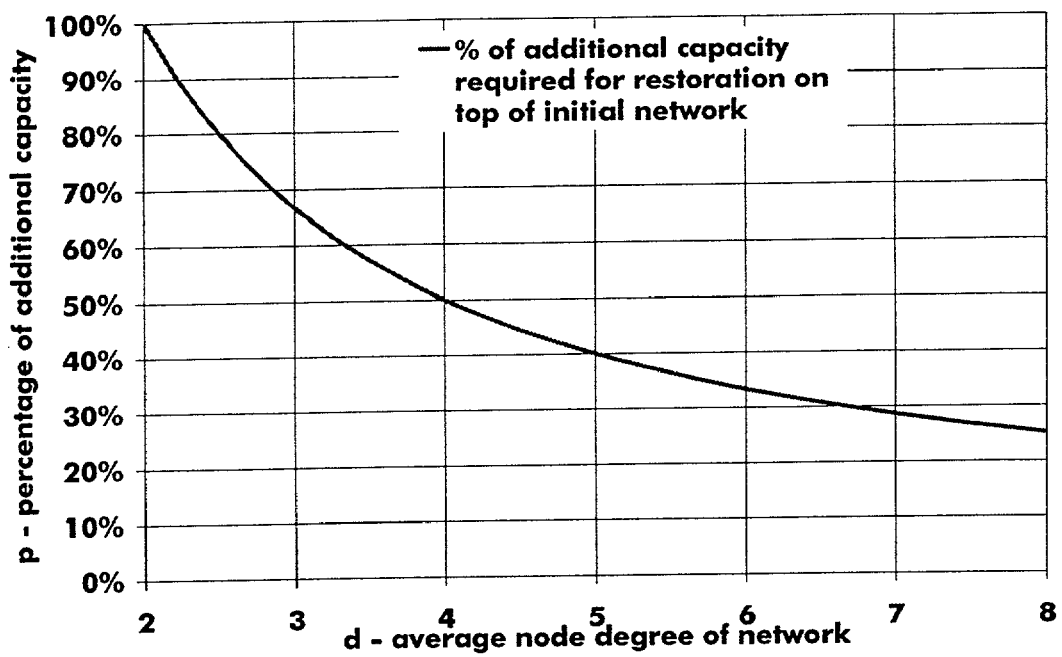
FIG. 6 shows the dependency of additional capacity on average node degree in a first embodiment.

Let p be the percentage of overhead capacity for a network represented by G=(V, A) needed in addition to make it restorable and d be the average node degree of the network. Furthermore, let G have a Hamiltonian mesh $G_h$. Then, the following relation holds p*d=2. The dependency of additional capacity on average node degree in this first embodiment is demonstrated in FIG. 6.

A second embodiment starts from the assumption that some of the capacity provided by the network G=(V, A) can be assigned for restoration purposes. Furthermore, it is assumed that if a cable or cable duct is cut the restoration capacity assigned to this cable or cable duct is cut as well. Hence, the question to be answered is how much capacity is at least to be reserved to ensure that traffic can be restored if one link fails.

The minimum restoration capacity in this second embodiment is found according to the invention by (step 1:) constructing a Hamiltonian mesh $G_h=(V, A_h)$ and (step 2:) reserving half of the capacity of each link of the Hamiltonian mesh as restoration capacity.

Obviously, the traffic in each arc of the Hamiltonian mesh can be restored. Further, all other arcs can be restored since half of the traffic can be routed clockwise and the other half of the traffic counter-clockwise through the Hamiltonian mesh. Furthermore, since any arc failure results in a full usage of the restoration capacity provided this restoration capacity provision is the absolute minimum possible for any network with balanced link capacities.

Figure 7:
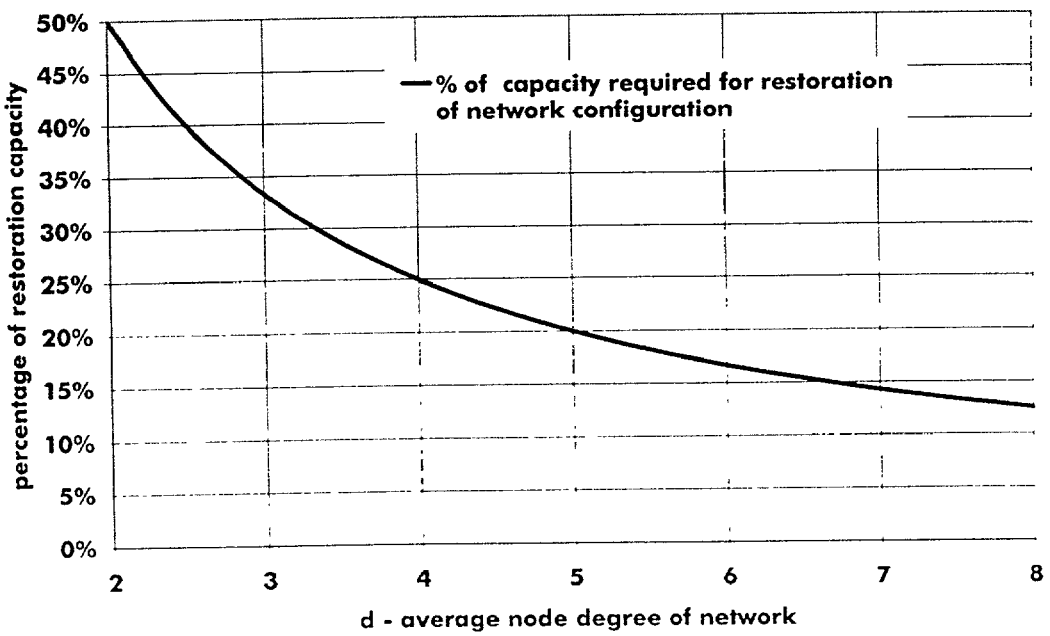
FIG. 7 shows the dependency of additional capacity on average node degree in a second embodiment.

Let p be the percentage of capacity for a network represented by G=(V, A) needed to make it restorable and d be the average node degree of the network. Furthermore, let G have a Hamiltonian mesh $G_h$. Then, the following relation for the second embodiment holds p*d=1. The dependency of reserved capacity on average node degree in this second embodiment is demonstrated in FIG. 7.

Restoration of the network in case of a single link failure is performed according to the following algorithm:

Case 1: If the failed link is element of the Hamiltonian mesh re-route all failed traffic along the other links of the Hamiltonian mesh.

Case 2: If the failed link is not in the Hamiltonian mesh re-route half of the failed traffic clockwise through the reserved capacity of the Hamiltonian mesh links and the other half counter-clockwise.

Figure 5:
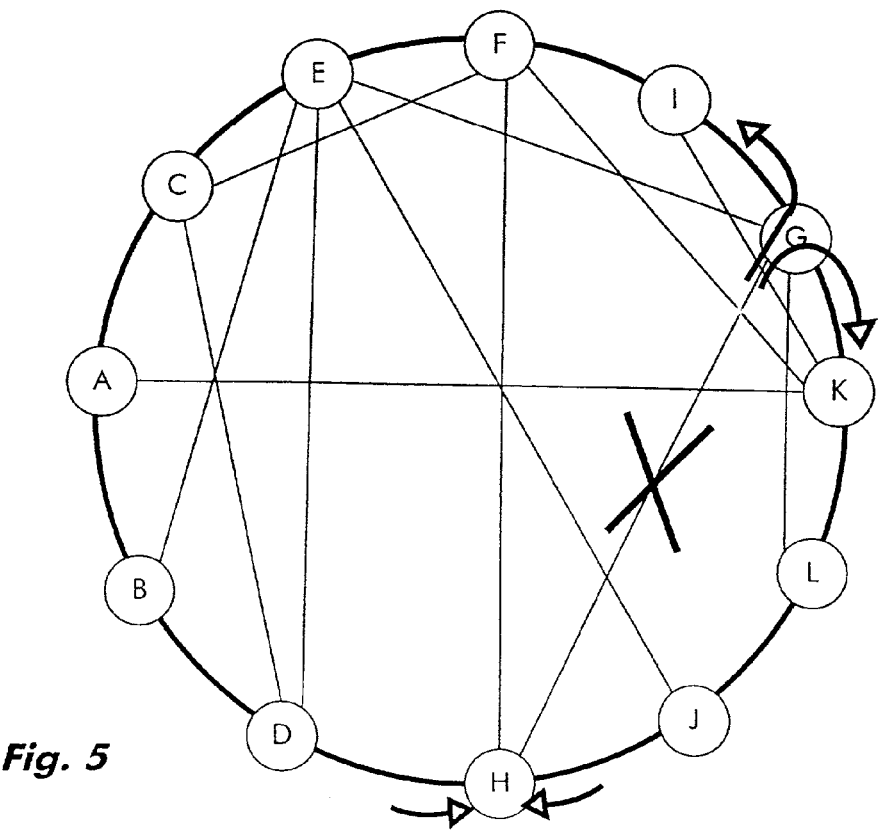
FIG. 5 shows restoration of a line failure in the above network.

Using the network representation of FIG. 4, restoration of a failure is shown schematically in FIG. 5. In this example, intersecting link H-G is cut and traffic from G to H needs to be restored. Since half of the capacity of the Hamiltonian mesh is reserved for protection, node G splits traffic destined for node H into two portions of equal size and transmits one portion clockwise and the other portion counter-clockwise around the Hamiltonian mesh. Restoration of the reverse direction from H to G is done accordingly (not shown).

As long as there is no failure in the ring, an idle signal is transmitted around the mesh in the reserved capacity. Such idle signal is also called "unequipped" signal. This means that any node in the network switches this unequipped signal from corresponding input to corresponding output port, irrespective of what the signal carries. In the case of a failure, only the nodes terminating the failed link need to be reconfigured to receive the affected traffic from the ports corresponding to the Hamiltonian mesh. Any intermediate node switch the signal that carries portion of the affected traffic through in the same manner as the unequipped signal before. Since the receiving node H detects the failure, he awaits traffic over the Hamiltonian mesh and knows therefore, that this traffic on the reserved capacity channel is destined for him. Hence, no additional signaling is required between any nodes to restore the network. As only the terminating nodes need to be reconfigured, restoration is very fast.

In spite of this, some transmission networks may require reconfiguration of the intermediate nodes, for example in the case of SDH, each input port must be configured to accept an actual signal structure. As the basic SDH transmission frame, which is called STM-N, carries higher order virtual containers VC-4, which may either be concatenated or not, and as concatenated VC-4 and non-concatenated VC-4 require different processing with respect to their pointers, it is mandatory that each input interface knows the signal structure it received. However, this reconfiguration can be done internally in the node without interaction of network management. Reconfiguration may be achieved in a node by detecting the actual signal structure and configuring the corresponding interface to accept this structure.

Figure 8:
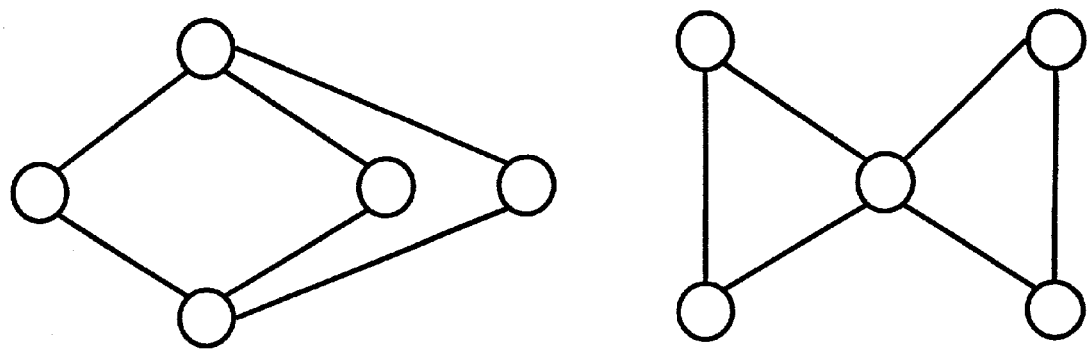
FIG. 8 shows examples of networks which no Hamiltonian mesh.

Unfortunately there are networks that do not have a Hamiltonian mesh. Some examples are depicted in FIG. 8. Obviously, these configuration can be found in real networks. Furthermore, finding a Hamiltonian mesh in an arbitrary network represented by a graph G=(V, A) is an NP-complete problem, and hence, difficult to find. Furthermore, there are no suitable conditions of the existence of a Hamiltonian mesh in a graph, since all the graphs with a guaranteed Hamiltonian mesh are graphs with a degree of "meshedness" that is not found in real applications.

However, a relaxation of the problem of finding a Hamiltonian graph is the one to find a mesh cover of the graph G. A mesh cover of G is a set of #M meshes $M_i=(V_{Mi}, A_{Mi})$ such that each node N of G is covered by at least one mesh and that any mesh has at least one node in common with another mesh.

The invention takes advantage of the recognition that any 2-arc connected graph has a mesh cover.

In the case where no Hamiltonian mesh can be found, planning of the network G=(V, A) in accordance with the present invention is performed with the following algorithm:

Algorithm: Mesh Cover Search

Step 0: i=1

Step 1: Pick one link $a_k$ from G and find a path between its two end nodes omitting $a_k$. Together with $a_k$ this path defines a mesh $M_i$.

Step 2: Pick a node $N_p \notin V_{Mi}$ and a node $N_q \in V_{Mi}$ for some i. By definition there exist two link-disjoint paths between these two nodes and for at least two links there are $a_i, a_k \notin A_{Mi}$ for all i. Eventually together with some links of the meshes $M_i$ these links form a mesh $M_{i+1}$.

Step 3: Since G is 2-link connected this process can be continued until all nodes are covered.

Step 4: Reserve C/2 of each link of the meshes as restoration capacity.

Figure 9:
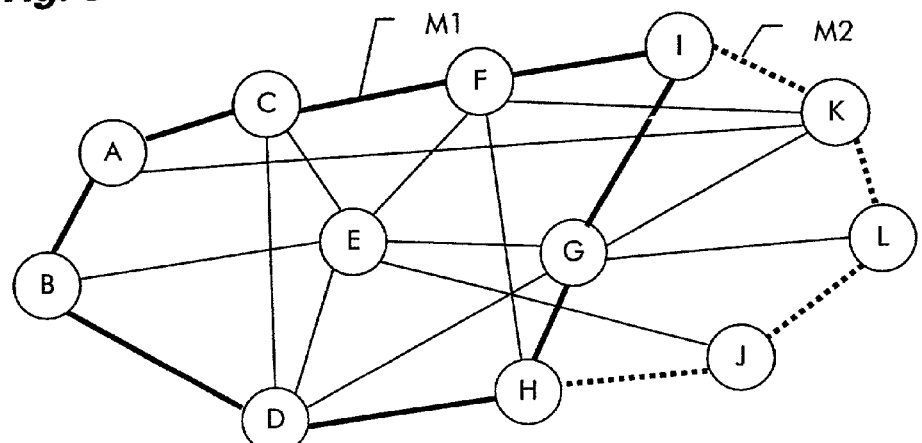
FIG. 9 shows a network coverage with two meshes.

FIG. 9 depicts this situation where a mesh cover of G is constructed starting from an arbitrary mesh M1 (bold lines) in G by adding an extra mesh M2 from/to a nodes of the mesh to some node not in the current mesh (dotted lines). Let p be the percentage of capacity for a network G=(V, A) needed to make it restorable and d be the average node degree of the network. Let M be the set of meshes that covers G. Then, the following relation holds $$p * d = \left(1 + \frac{\#M - 1}{\#V}\right).$$

Figure 10:
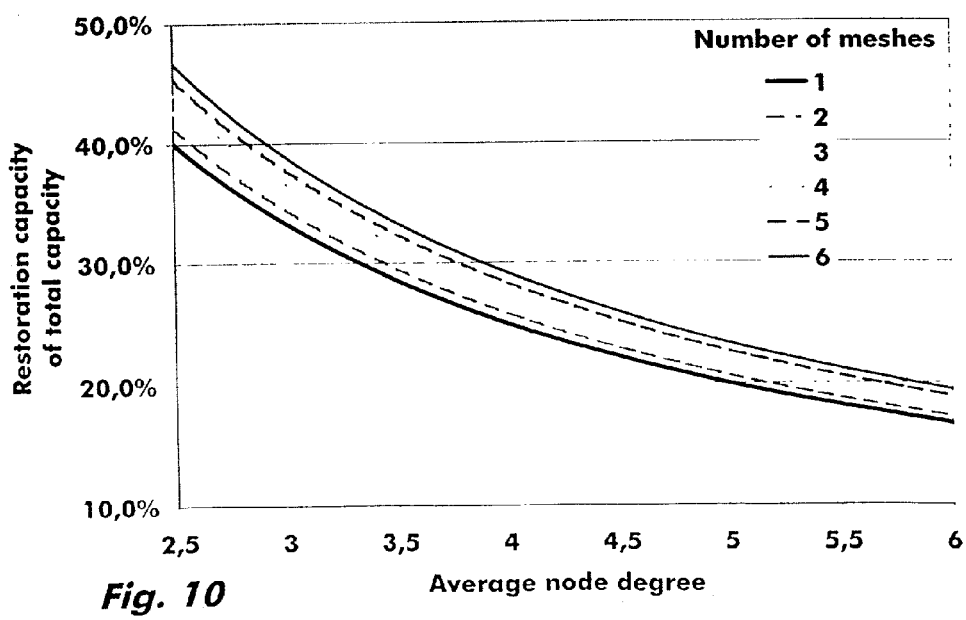
FIG. 10 shows the dependency of additional capacity on average node degree for a mesh coverage.

FIG. 10 depicts a numeric evaluation for a network with 30 nodes in accordance with this relation.

Given two graphs G'=(V', A') and G''=(V'', A'') both having a Hamiltonian mesh $G'_h$ and $G''_h$, respectively. The two graphs are merged such that two adjacent nodes of $G'_h$ are merged with two adjacent nodes of $G''_h$ eventually omitting the excess arc. Then the resulting graph G=(G'∪G'')=(V'∪V'', A'∪A'') has a Hamiltonian mesh. Merging two graphs with Hamiltonian meshes (bold lines) is shown in FIGS. 11a–c. FIG. 11a shows a first network with Hamiltonian mesh, FIG. 11b shows a second network with Hamiltonian mesh, and FIG. 11c shows the merged network.

Figure 12:
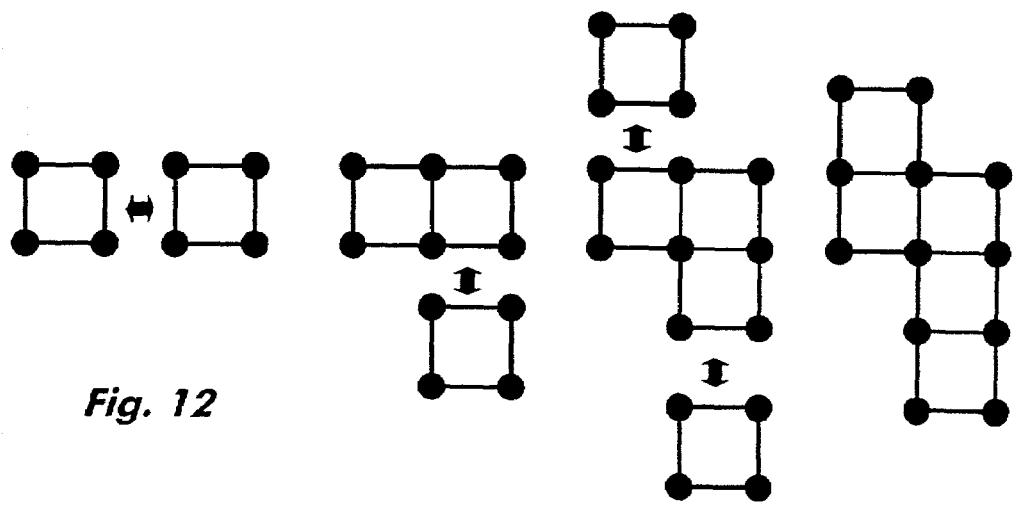
FIG. 12 shows a specific case for merger of chessboard-like networks.

A special case are graphs constructed according to merging method where starting with a graph of 4 nodes having a Hamiltonian mesh, other graphs of 4 nodes with a Hamiltonian mesh are successively merged. Eventually this results in structures similar to a chess board all of which contain a Hamiltonian mesh. By definition this results in a graph with an even number of nodes. This "chess board topology" is shown in FIG. 12. Hence, any graph G=(V, A) that contains a subgraph $G_c$=(V, $A_c$) isomorphic to a chess board graph has a Hamiltonian mesh.

Figure 11:
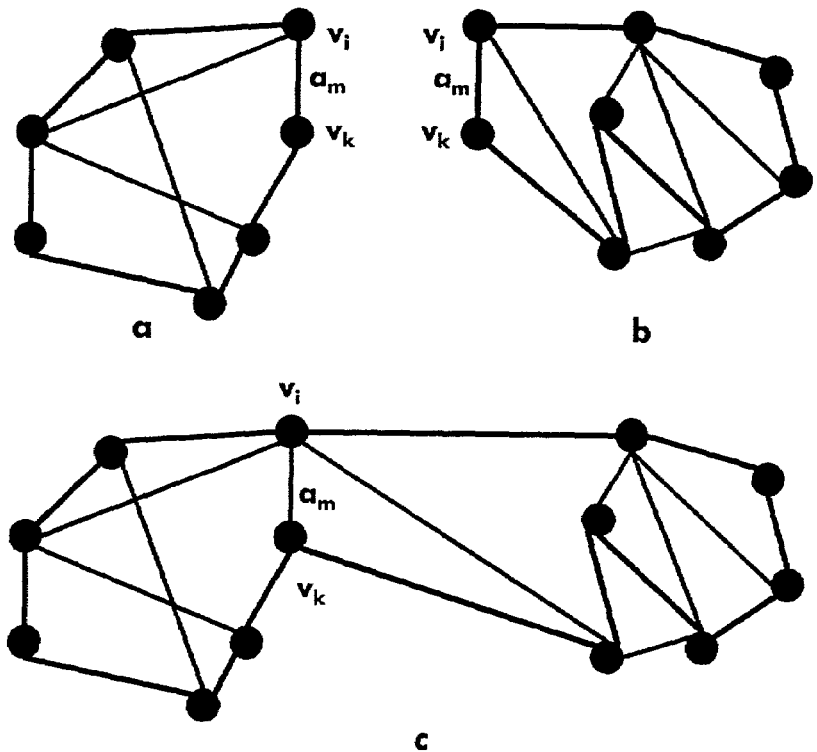
FIG. 11 shows the principle of merging two networks.

Chess board topologies—in the generalized sense depicted in FIG. 11—are rather common topologies found in geographically distributed networks. Therefore, in most of the network installations a Hamiltonian mesh can easily be detected and hence, the minimum restoration capacity can be found.

As outlined above, finding a Hamiltonian mesh is an NP-complete problem and thus, the appropriate methodology to search for a Hamilton mesh is deploying a 'branch-and-search' algorithm. However, it is recognized that in the networking case there are as many computers available as there are nodes in the network. An improvement of the present invention therefore proposes a distributed implementation of the Hamilton mesh search.

GMPLS (Generalized Multi-Protocol Label Switching) has gained plenty of attention recently as it promises to be the technology for very fast connection provisioning even without the intervention of a central instance of network management. GMPLS is described in the articles Banerjee, A. et al., "Generalized Multiprotocol Label Switching: An Overview of Routing and Management Enhancements", IEEE Communications Magazine, Vol. 39, No. 1, January 2001, and Banerjee, A. et al., "Generalized Multiprotocol Label Switching: An Overview of Signalling Enhancements and Recovery Techniques", IEEE Communications Magazine, Vol. 39, No. 7, July 2001, which are incorporated by reference herein. The basic idea is that path possibilities negotiated between the network elements and eventually setting up the corresponding paths—and for that the network elements use the protocol called GMPLS. Furthermore, as GMPLS is subject to considerable standardization efforts, its deployment ensures the inter-working of different vendors' equipment.

Since the dynamic bandwidth allocation algorithms with GMPLS requires distributed processing in the nodes of the network, the distributed computational platform is already in place and can be used for a distributed Hamilton path search.

For this implementation the following protocol is suggested. When the search process is started a seed node initiates the following message to all its neighbors: Message=(ListOfNodesVisited, IncurredCost)

Initially the ListOfNodesVisited contains the Node ID of the seed node only and the IncurredCost=0. Each receiving node $N_{rec}$ evaluates the incoming message according to the following algorithm:

Algorithm: Distributed Hamilton Mesh Search

Step 1: $N_{rec}$ updates IncurredCost with the cost assigned to the link through which the message has been received.

Step 2: Processing of "ListOfNodesVisited".

Case 1: If $N_{rec}$ is not in the "ListOfNodesVisited" the node appends its $N_{rec}$ID to the list and forwards the message to all its topological neighbours.

Case 2: If $N_{rec}$ is in the list, the message is evaluated since a mesh has been found. With #L the length of the ListOfNodesVisited and q the list position of N then obviously the length of the mesh is #L−q+1 .

Case 2a: If the mesh length is #V then a Hamilton mesh has been found an the network is notified of this event with a broadcast message terminating the search process.

Case 2b: If the mesh length less is #V the node saves the longest mesh with least IncurredCost.

However, even with a distributed implementation a combinatorial explosion in terms of algorithmic complexity cannot be excluded since the existence of a Hamiltonian mesh is not ensured. The number of messages to be checked in a node may be as many as $$\text{Max\#}OfMessages = \max_{1 \le k \le \#V-1} \left( \binom{\#V-2}{k-1}(k-1)! \frac{d^k}{(\#V-1)^k} \right)$$

This results e.g. for a network with #V=30 nodes with an average node degree d=3,5 in almost 400.000 messages. These figures indicate that a simple Hamilton mesh search may not yield the desired result, even if this would in principle be possible as the messages have only few bytes length.

In order to facilitate a capacity assignment that ensures the following improved procedure is suggested:

When initiating the search for a Hamiltonian mesh the seed node defines a time-out that terminates this search if no Hamiltonian mesh has been found. It can be assumed that the time-out is chosen such that at least one mesh has been found. When the search is terminated because of time-out each node communicates its largest mesh to the seed node. The seed node arbitrates on the results and communicates the largest mesh to the other network nodes.

Nodes not in this mesh initiate now a search for node-disjoint largest paths ending at a node of the largest mesh in a similar manner as described before and in algorithm of finding a mesh cover. After the termination of this algorithm a mesh cover has been identified and the restoration capacities can be assigned.

Even though the assignment of restoration capacities needs to be done when planning the network, the implementation according to the procedure described above allows a dynamic re-assignment of the restoration capacities. A re-assignment might become necessary to avoid network bottle-necks which can be anticipated by the traffic engineering tool that commonly is used in co-operation with GMPLS based provisioning algorithms. In this re-assignment those links of the network graph are omitted which have a traffic assignment of more that C/2.

The fastest way to restore the network in case of a link failure is to set up a circular paths along the meshes with restoration capacity reservations. In the case of the Hamiltonian mesh and a restoration event only the network elements at the end nodes of the failed link needs to be reconfigured which can be done easily and fast.

The configuration of all network elements in the network can also be done by a central network management device which has knowledge on the topology of the network. The network management determines a Hamiltonian mesh or if the network does not have a Hamiltonian mesh for topological reasons, a mesh coverage and reserves part or the total link capacity of the Hamiltonian mesh or mesh coverage for restoration purpose.

Figure 13:
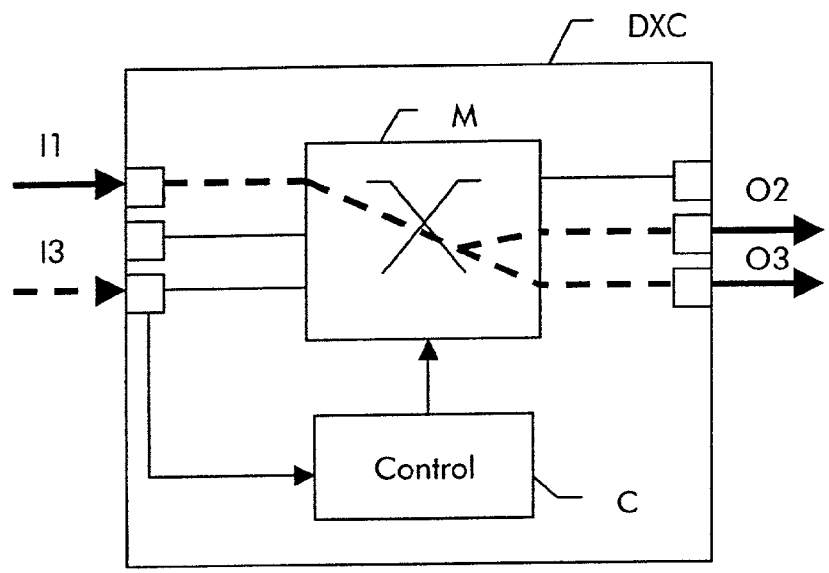
FIG. 13 shows a block diagram of a network element used in the above network logically represented as a ring.

A network element according to the invention is presented in FIG. 13. This network element is a digital cross-connect DXC with a number of input ports and output ports. For sake of simplicity, only three input and output ports are shown in the figure. The input and output ports are connected to a switching matrix M which is controlled by a control unit C. The input ports perform a check as to see whether there is a received signal and whether the received signal is valid. An alarm signal from the input ports feeds to the control unit C.

The operation of the network element in the case of a failure is the following: An input signal I3 is corrupt due to a line failure. The corresponding input ports detects the failure condition and reports this as an alarm signal to the control unit C. Responsive to detecting the failure condition, the control units configures the switching matrix M to recover the failure. It is assumed in this example, that traffic signal I3 is to be routed under normal operation in the reverse to failed signal I3. As the network element detects a failure in receive direction of I3, it is clear that also the transmit direction would be affected by the failure and traffic signals to be transmitted in this reverse direction need thus be rerouted. This is done in the switching matrix M under the control of control unit C by splitting the traffic signal into two equal portions and switching the two portions to corresponding output ports which transmit these two signals portions as signals O2 and O3. O2 and O3 represent in this example the two directions of a Hamiltonian mesh as described previously. This operation effects the failure recovery as shown in FIG. 5 by network node G.

The present invention provides a mechanism for ultra-fast restoration in balanced networks. The basic mechanism is entirely based on the topological properties of a network allowing a best allocation of minimum additional capacities needed to make the network restorable. The only topological parameter needed to evaluate the amount of spare capacity required to achieve full restorability is the average node degree giving an indication of the "meshedness" of the network.

The above embodiments have been described using an example network topology under the assumption that all links in the network have equal capacity. However, this assumption was introduced for sake of simplicity only and it should be understood that the present invention is not bound to such network topology but can be applied to any meshed network. It should be clear to those skilled in the art, taking into account the principles and rules as described above, that many alternatives and variations of the present invention are possible. The invention as described above is particularly applicable to SDH/SONET type networks (ITU-T G.707) and OTN type networks (ITU-T G.709).

Figure 14:
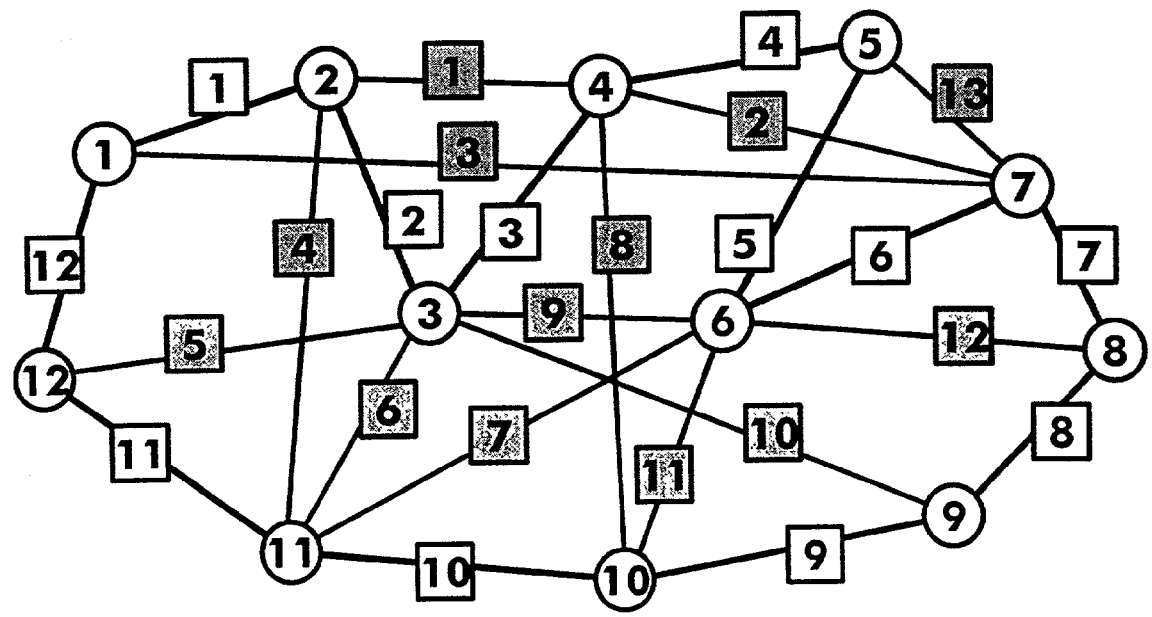
FIG. 14 shows the network configuration used to describe capacity assignment in unbalanced networks.

A real network may have links of different capacity. Such a network is called unbalanced. In an improved embodiment of the present invention, a capacity assignment in unbalanced networks is proposed. The example used to explain the assignment in this embodiment is shown in FIG. 14. The small circles denote network nodes numbered with 1–12. The bold links are links of the Hamiltonian mesh and are depicted by numbers 1–12 in small squares. The remaining links herein called chords are depicted by numbers 1–12 in gray-shaded squares.

The method starts with the step of finding a Hamiltonian mesh $G_h$. In a second step, a capacity assignment is searched. For the capacity assignment, the following parameter definitions are made:

$cap(a_n)$ is the capacity of link $a_n$,
$rest(a_n)$ is the restoration capacity reservation on link $a_n$,
$work(a_n)$ is the working capacity reservation on link $a_n$.

Then, the constraint are defined as follows:

For any link $ch_k$ not in the mesh (denoted chord), define the two half meshes of the Hamiltonian $K_1(ch_k)$ and $K_2(ch_k)$ where $K_1(ch_k) \cup K_2(ch_k) = G_h$ and $â_i \in K_1(ch_k)$. Define further $rest(a_i)$ the restoration capacity assigned to link $a_i$ and $rest(K_y(ch_k))$ the minimum restoration capacity assigned to a link of $(K_y(ch_k))$, $y=1, 2$. Then for each chord $ch_k$ the following must hold $$rest(K_1(ch_k)) + rest(K_2(ch_k)) \geq cap(ch_k)$$

and $$rest(K_y(ch_k)) \leq cap(a_i), \forall a_i \in K_y(ch_k), y=1, 2.$$

The capacity assignment algorithm starts then with a step of finding an initial feasible configuration. The result of this initial assignment is shown in table 1 below.

Pick any link $â_1$ of $G_h$.

Set-up a table with #V rows and (#A–#V) columns. The entries of the table are defined as follows:

$T(1, k) = \lceil cap(ch_k)/2 \rceil$ where $\lceil x \rceil$ denotes the smallest integer $\geq x$, and $T(1, k)$ corresponds to link $â_i$ $T(n, k) = T(1, k)$ if an $a_n \in K_1(ch_k)$, $a_n \neq â_i$ $T(n, k) = \lceil cap(a_n) - T(1, k) \rceil$ if $a_n \in K_2(ch_k)$. The latter values have are represented in the table with gray background.

$rest(a_n) = _n^{max}\{T(n, k)\}$ indicates the restoration capacity to be assigned to link $a_n$.

The configuration as defined above may not comply with the constraints. Links which do not comply with the constraints are marked with an "x" in table 1 below which indicates that here the constrain $rest(K_y(ch_k)) \leq cap(a_i)$, $\forall a_i \in K_y(ch_k)$ is violated.

TABLE 1

Initial configuration

| | Chords | 1 | 2 | 3 | 4 | 5 | 6 | 7 | 8 | 9 | 10 | 11 | 12 | 13 | |
|---|---|---|---|---|---|---|---|---|---|---|---|---|---|---|---|
| | Chord capacity | 100 | 90 | 70 | 50 | 60 | 80 | 95 | 85 | 65 | 40 | 75 | 55 | 55 | 920 |
| # | Cap. | | | | | | | | | | | | | | Restoration |
| Mesh link 1 | 70 | 50 | 45 | 35 | 25 | 30 | 40 | 48 | 43 | 33 | 20 | 38 | 28 | 28 | 50 |
| 2 | 60 | | 45 | 35 | | 30 | 40 | 48 | 43 | 33 | 20 | 38 | 28 | 28 | 50 |
| 3 | 65 | | 45 | 35 | | | | 48 | 43 | | | 38 | 28 | 28 | 50 |
| 4 | 70 | 50 | | 35 | | | | 48 | | | | 38 | 28 | 28 | 50 |
| 5 | 60 | 50 | | 35 | | | | 48 | | | | 38 | 28 | | 50 |
| 6 | 55 | 50 | | 35 | | | | | | 33 | | | | | 50 |
| 7 | 50 | 50 | 45 | | | | | | | 33 | | | | 28 | 50 |
| 8 | 70 | 50 | 45 | | | | | | | 33 | | | 28 | 28 | 50 |
| 9 | 55 | 50 | 45 | | | | | | | 33 | 20 | | 28 | 28 | 50 |
| 10 | 40 | 50x | 45x | | | | | | x43x | 33 | 20 | 38 | 28 | 28 | 50 |
| 11 | 90 | 50 | 45 | | 25 | | 40 | 48 | 43 | 33 | 20 | 38 | 28 | 28 | 50 |
| 12 | 80 | 50 | 45 | | 25 | 30 | 40 | 48 | 43 | 33 | 20 | 38 | 28 | 28 | 50 |
| | 765 | | | | | | | | | | | Total cost | | | 620 |

As explained above wit reference to FIG. 4, the Hamiltonian mesh can be logically represented as a ring intersected by the remaining network links, which are therefore called chords. Each chord logically divides the logical ring into two semicircles. The figures with no background color represent one of these semicircles while the figures with back color represent the other semicircle. Obviously, the sum of the reserved capacity of the two semicircles must equal in each column the capacity of the chord to be restored.

In a next step of the capacity assignment, an initial feasible configuration is determined by searching each column k in table 1 for an "x" and modify T(1, k) until all "x" vanished. The result is shown in table 2 below.

if entry has no back color, reduce T(1, k)
if entry has back color, increase T(1, k)
If there is no assignment T(1, k) that makes all "x" vanish in column k there is no feasible assignment at all.

The assignment of minimum restoration capacity reservation rest($a_n$) is given by the last column of table 3. Naturally the same algorithm is also applicable for mesh covers.

In addition, the restoration capacity reservations for traffic in the mesh links may be computed, i.e. finding an assignment of traffic and restoration capacities within a mesh maximizing traffic capacities given the capacities of the mesh links.

Step 1: Sort all links according to increasing capacity
$cap_M(a_1) \leq cap_M(a_2) \ldots \leq cap_M(a_N)$, $rest_M(a_i)+work_M(a_i)=cap_M(a_i)$,
$cap_M(a_i)$ mesh link capacity, $work_M(a_i)$ traffic capacity, $rest_M(a_i)$ restoration capacity reservation
(reducing traffic in more than half of the links reduces total traffic)

Step 2: Find median $cap_M(a_n)$ with N=2n or N=2n+1
Initial assignment

TABLE 2

Initial feasible configuration

|  | Chords | 1 | 2 | 3 | 4 | 5 | 6 | 7 | 8 | 9 | 10 | 11 | 12 | 13 |  |
|---|---|---|---|---|---|---|---|---|---|---|---|---|---|---|---|
|  | Chord capacity | 100 | 90 | 70 | 50 | 60 | 80 | 95 | 85 | 65 | 40 | 75 | 55 | 55 | 920 |
|  | # Cap. |  |  |  |  |  |  |  |  |  |  |  |  |  | Restoration |
| Mesh link | 1  70 | 40 | 40 | 35 | 25 | 30 | 40 | 55 | 40 | 33 | 20 | 38 | 28 | 28 | 55 |
|  | 2  60 |  | 40 | 35 |  | 30 | 40 | 55 | 40 | 33 | 20 | 38 | 28 | 28 | 60 |
|  | 3  65 |  | 40 | 35 |  |  |  | 55 | 40 |  |  | 38 | 28 | 28 | 60 |
|  | 4  70 | 40 |  | 35 |  |  |  | 55 |  |  |  | 38 | 28 | 28 | 55 |
|  | 5  60 | 40 |  | 35 |  |  |  | 55 |  |  |  | 38 | 28 |  | 55 |
|  | 6  55 | 40 |  | 35 |  |  |  |  |  | 33 |  |  |  |  | 50 |
|  | 7  50 | 40 | 40 |  |  |  |  |  |  | 33 |  |  |  | 28 | 45 |
|  | 8  70 | 40 | 40 |  |  |  |  |  |  | 33 |  |  | 28 | 28 | 45 |
|  | 9  55 | 40 | 40 |  |  |  |  |  |  | 33 | 20 |  | 28 | 28 | 45 |
|  | 10  40 | 40 | 40 |  |  |  |  | 40 | 33 | 20 | 38 | 28 | 28 |  | 40 |
|  | 11  90 | 40 | 40 |  | 25 |  | 40 | 55 | 40 | 33 | 20 | 38 | 28 | 28 | 55 |
|  | 12  80 | 40 | 40 |  | 25 | 30 | 40 | 55 | 40 | 33 | 20 | 38 | 28 | 28 | 55 |
|  | 765 |  |  |  |  |  |  |  |  |  |  |  | Total cost | | 620 |

In a next step of the algorithm, the initial feasible configuration is altered to find an optimal feasible configuration. This is represented in table 3. Find an optimal feasible configuration is performed by modifying T(1, k) of each column by adding and subtracting 1 and check whether the total cost improves. If the total cost improves modify T(1, k) until a "x" occurs, i.e. some capacity constraint is violated.

$rest_M(a_i)=cap_M(a_n)/2$ for $1 \leq i \leq n$ $work_M(a_i)=cap_M(a_n)/2$ for $n \leq i \leq N$ Step 3: Adjust initial assignment
if $cap_M(a_n)/2 > cap_M(a_1)$ then $rest_M(a_1)=cap_M(a_1)$, $work_M(a_i)=cap_M(a_1)$ for $2 \leq i \leq N$

TABLE 3

Optimal feasible configuration

|  | Chords | 1 | 2 | 3 | 4 | 5 | 6 | 7 | 8 | 9 | 10 | 11 | 12 | 13 |  |
|---|---|---|---|---|---|---|---|---|---|---|---|---|---|---|---|
|  | Chord capacity | 100 | 90 | 70 | 50 | 60 | 80 | 95 | 85 | 65 | 40 | 75 | 55 | 55 | 920 |
|  | # Cap. |  |  |  |  |  |  |  |  |  |  |  |  |  | Restoration |
| Mesh link | 1  70 | 40 | 40 | 30 | 25 | 30 | 40 | 55 | 40 | 40 | 40 | 40 | 40 | 40 | 55 |
|  | 2  60 |  | 40 | 30 |  | 30 | 40 | 55 | 40 | 40 | 40 | 40 | 40 | 40 | 60 |
|  | 3  65 |  | 40 | 30 |  |  |  | 55 | 40 |  |  | 40 | 40 | 40 | 60 |
|  | 4  70 | 40 |  | 30 |  |  |  | 55 |  |  |  | 40 | 40 | 40 | 55 |
|  | 5  60 | 40 |  | 30 |  |  |  | 55 |  |  |  | 40 | 40 |  | 55 |
|  | 6  55 | 40 |  | 30 |  |  |  |  |  | 40 |  |  |  |  | 50 |
|  | 7  50 | 40 | 40 |  |  |  |  |  |  | 40 |  |  |  | 40 | 45 |
|  | 8  70 | 40 | 40 |  |  |  |  |  |  | 40 |  |  | 40 | 40 | 45 |
|  | 9  55 | 40 | 40 |  |  |  |  |  |  | 40 | 40 |  | 40 | 40 | 45 |
|  | 10  40 | 40 | 40 |  |  |  |  | 40 | 40 | 40 | 40 | 40 | 40 |  | 40 |
|  | 11  90 | 40 | 40 |  | 25 |  | 40 | 55 | 40 | 40 | 40 | 40 | 40 | 40 | 55 |
|  | 12  80 | 40 | 40 |  | 25 | 30 | 40 | 55 | 40 | 40 | 40 | 40 | 40 | 40 | 55 |
|  | 765 |  |  |  |  |  |  |  |  |  |  |  | Total cost | | 620 |

The final restoration capacity reservation $rest_F(a_i)$ for a mesh link is then computed with $$rest_F(ai)=Max\{rest_M(a_i), rest(a_i)\}$$

The maximum traffic that can be accommodated on a Hamiltonian mesh link is given by the capacity available on the link for traffic, i.e.

$$a_n \forall \text{work } (a_n) \leq cap(a_n) - rest_F(a_n)$$

Thus, the assignment triple of Hamiltonian mesh link $a_n$ $\{cap(a_n), work(a_n), rest_F(a_n)\}$ is finally computed for all links.

Figure 15:
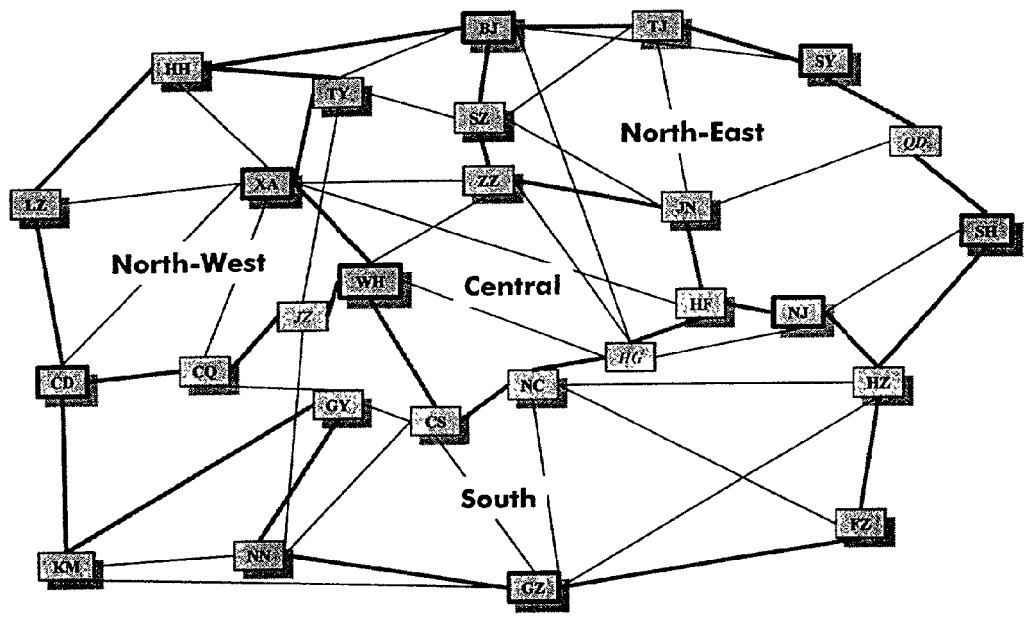
FIG. 15 shows another network configuration used to describe a mesh cover.

In a further advantageous embodiment, use is made of the mesh cover previously described with reference to FIGS. 8 and 9. In the case that the network is too large and geographically extended that a single mesh is not meaningful, a mesh cover of the network is the ideal solution. In following this concept is derived on the basis of a network, schematically presented in FIG. 15.

Figure 16:
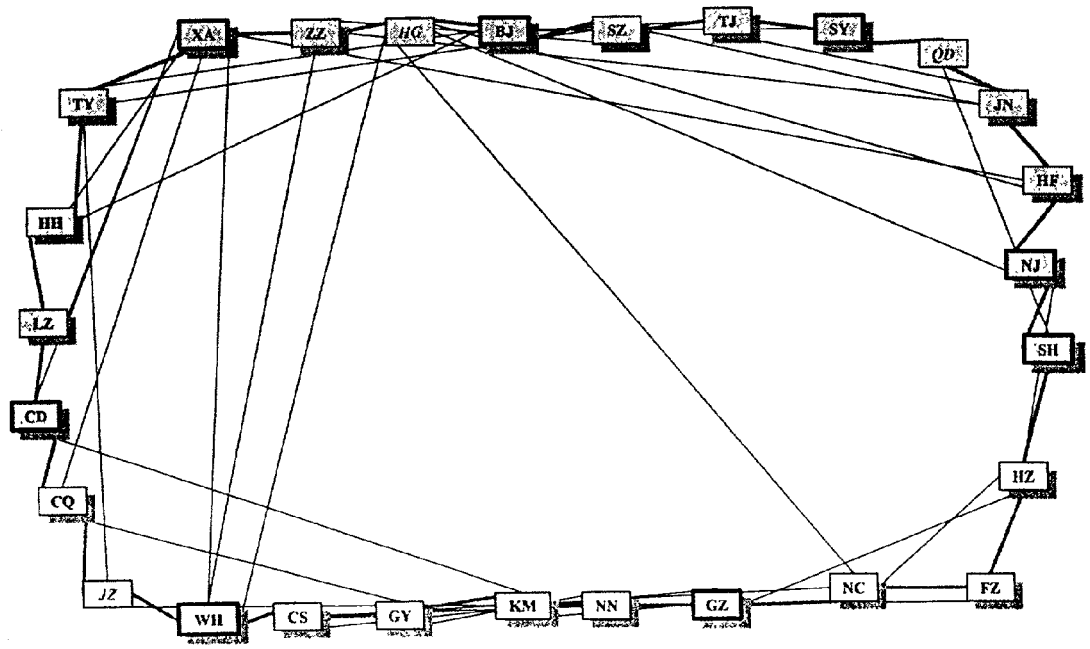
FIG. 16 shows a Hamiltonian mesh in the network configuration of FIG. 15.
Figure 17:
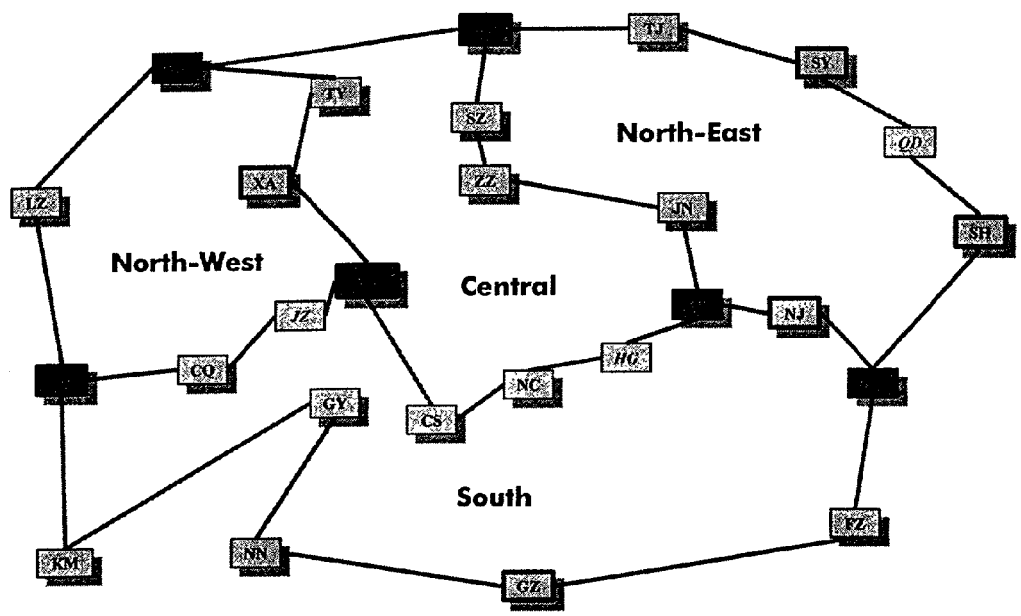
FIG. 17 shows a first mesh cover in the network configuration of FIG. 15 using shared restoration capacity for a resource ontimized restoration approach.

In this example, a single Hamilton mesh can be found which is shown in FIG. 16. Obviously taking into account geographical extension, restoration along this mesh seems not to be the best solution. A mesh cover of this network, which is shown in FIG. 17 looks much more tidy. There are four meshes—a north-east, central, north-west, and south mesh. This choice of mesh cover has the advantage that there are no links with end nodes in two different meshes. In the case that the restoration should be performed within one mesh the restoration capacity reservation assignment task for the network can be reduced to assigning them in four sub-networks and combining the results. Eventually along the links of the mesh skeleton, blind connections are set up for each mesh link according to the computed restoration capacity reservation.

Within this mesh cover, basically two restoration approaches are suitable depending on the bandwidth and time constraints. A first approach is the Resource Optimised Mesh Restoration (ROMP), which treats each mesh as a single entity and restoration resources are shared between on links that belong to more than one mesh. However, between any two branching nodes the restoration capacity reservations are connected within the respective network elements.

This strategy has the disadvantage that network elements at the branching nodes cannot be pre-configured to satisfy the needs for each mesh, there is a choice of two possible configurations (in general number of links—1). The choice of the configuration of the network elements at branching nodes needs to be communicated via a protocol (e.g. based on GMPLS) or some centralized network management system and DCN.

Figure 18:
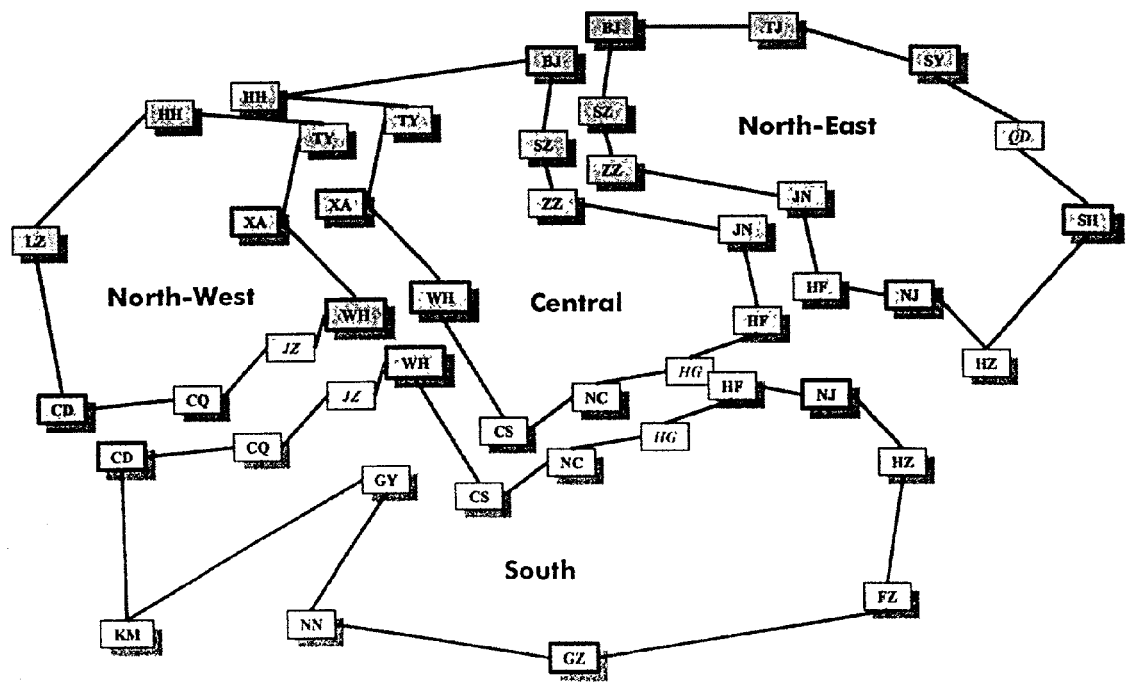
FIG. 18 shows a second mesh cover in the network configuration of FIG. 15 for a time optimized restoration approach without shared restoration capacity.

The alternative approach is the Time Optimized Mesh Protection (TOMP), which treats each mesh as a single entity and restoration resources are not shared between on links that belong to more than one mesh. This is schematically shown in FIG. 18. Within a mesh the restoration capacity reservations are connected in the respective network elements.

This strategy has the main advantage that network elements at the branching nodes can be pre-configured to satisfy the needs for each mesh. Hence, the only re-configuration necessity occurs in the two network elements affected by the failure, i.e. the two that generate the LOS (Loss Of Signal) alarms. Therefore, no signaling between network nodes is necessary. The protection speed is solely dependent on the speed with which a network element can re-configure itself according to some pre-configuration plan.

Furthermore, these additional resources allow handling even multiple simultaneous failures provided they occur in different meshes.

Between these two alternative approaches ROMP and TOMP, a mixed approach using both is also possible.

What is claimed is:

1. A method of restoring a meshed transmission network upon occurrence of a line failure, said method comprising:
    determining at least one mesh in the network, said mesh being a closed sequence of bi-directional links traversing each node part of the mesh exactly once, wherein remaining links in the network, which do not form part of the mesh but being protected by the mesh, intersect said mesh;
    reserving transmission capacity within said mesh for restoration purpose;
    routing during failure-free operation an idle signal along said mesh using said reserved capacity; and
    in the case of a failure of a link in the network, rerouting traffic from the failed link over said mesh using said reserved capacity.

2. A method according to claim 1, wherein said mesh is a Hamiltonian mesh traversing each node in the network exactly once.

3. A method according to claim 2, comprising:
    reserving half of the link capacity of said Hamiltonian mesh for restoration purpose and
    in the case of a failure, splitting traffic to be transmitted over the failed link into two portions and rerouting said two portions over two directions of said Hamiltonian mesh using said reserved capacity.

4. A method according to claim 1, wherein said rerouting is carried out in the end nodes of said failed link, only.

5. A method according to claim 2, wherein said determining a Hamiltonian mesh is carried out using a distributed search by spreading messages between the network nodes using GMPLS protocol.

6. A method according to claim 2, wherein, if no Hamiltonian mesh could be found for the network, the method comprises determining a mesh coverage of two or more meshes for the network and reserving transmission capacity within said meshes for restoration purpose.

7. A method according to claim 2, further comprising:
    augmenting the transmission capacity of said Hamiltonian mesh by doubling the Hamiltonian mesh transmission capacity; and
    reserving said augmented capacity for restoration purpose.

8. A method according to claim 5, wherein a time-out is applied to the messages to avoid explosion of the number of generated messages and wherein in case the time-out lapses without finding a Hamiltonian mesh, a largest mesh found is taken and a distributed search is initiated under the network nodes not part of the largest mesh to determine a mesh coverage.

9. A method according to claim 1, further comprising determining a capacity assignment for the links of the mesh based on the maximum capacity of each link and of the capacity of the links to be protected, said capacity assignment being performed by the steps of determining an initial capacity assignment, modifying said initial capacity assignment in the case of constraint violations to obtain an initial feasible capacity assignment and optimizing said initial feasible capacity assignment by minimizing a cost function to obtain an optimized feasible capacity assignment.

10. A method according to claim 1, further comprising logically dividing said network into geographical sub-networks and determining a Hamiltonian mesh for each of said sub-networks, each Hamiltonian mesh traversing each node of its corresponding sub-network exactly once, the set of Hamiltonian meshes forming a mesh cover for said network.

11. A method of restoring a meshed transmission network upon occurrence of a line failure, said method comprising:

determining a Hamiltonian mesh in the network, said Hamiltonian mesh being a closed sequence of bi-directional links traversing each node in the network exactly once, wherein remaining links in the network, which do not form part of the Hamiltonian mesh but being protected by the Hamiltonian mesh, intersect said Hamiltonian mesh; and if no Hamiltonian mesh could be found for the network, determining a mesh coverage of two or more meshes for the network and reserving transmission capacity within said meshes for restoration purpose.

12. A method of restoring a meshed transmission network upon occurrence of a line failure, said method determining a Hamiltonian mesh in the network, said mesh being a closed sequence of bi-directional links traversing each node in the network exactly once, wherein remaining links in the network, which do not form part of the Hamiltonian mesh but being protected by the Hamiltonian mesh, intersect said Hamiltonian mesh;

augmenting the transmission capacity of said Hamiltonian mesh by doubling the Hamiltonian mesh transmission capacity; and reserving said augmented capacity for restoration purpose.

13. A method of restoring a meshed transmission network upon occurrence of a line failure, said method comprising determining a Hamiltonian mesh in the network, said Hamiltonian mesh being a closed sequence of bi-directional links traversing each node of the network exactly once, wherein remaining links in the network, which do not form part of the Hamiltonian mesh but being protected by the Hamiltonian mesh, intersect said Hamiltonian mesh;

reserving transmission capacity within said mesh for restoration purpose; and in the case of a failure of a link in the network, rerouting traffic from the failed link over said mesh using said reserved capacity;

wherein said determining a Hamiltonian mesh is carried out using a distributed search by spreading messages between the network nodes using GMPLS protocol, and wherein a time-out is applied to the messages to avoid explosion of the number of generated messages and wherein in case time-out lapses without finding a Hamiltonian mesh, a largest mesh found is taken and a distributed search is initiated under the network nodes not part of the largest mesh to determine a mesh coverage.

14. A method of restoring a meshed transmission network upon occurrence of a line failure, said method determining at least one mesh in the network, said mesh being a closed sequence of bi-directional links traversing each node part of the mesh exactly once, wherein remaining links in the network, which do not form part of the mesh but being protected by the mesh, intersect said mesh;

determining a transmission capacity assignment for the links of the mesh based on the maximum transmission capacity of each link and of the transmission capacity of the links to be protected, said transmission capacity assignment being performed by determining an initial transmission capacity assignment, modifying said initial transmission capacity assignment in the case of constraint violations to obtain an initial feasible transmission capacity assignment and optimizing said initial feasible transmission capacity assignment by minimizing a cost function to obtain an optimized feasible transmission capacity assignment;

reserving transmission capacity within said mesh for restoration purpose; and in the case of a failure of a link in the network, rerouting traffic from the failed link over said mesh using said reserved capacity.

15. A method of restoring a meshed transmission network upon occurrence of a line failure, said method comprising:

logically dividing said network into geographical sub-networks and determining a Hamiltonian mesh for each of said sub-networks, each Hamiltonian mesh traversing each node of its corresponding sub-network exactly once, the set of Hamiltonian meshes forming a mesh cover for said network;

reserving transmission capacity within said mesh cover for restoration purpose; and in the case of a failure of a link in the network, rerouting traffic from the failed link over said mesh cover using said reserved capacity.

16. A method of determining the minimum restoration capacity in a meshed transmission network, said method comprising:

determining a Hamiltonian mesh for each sub-network in the network, said Hamiltonian mesh being a closed sequence of bi-directional links traversing each node of its corresponding sub-network exactly once, the set of Hamiltonian meshes forming a mesh cover for said network; and reserving half of the transmission capacity within said Hamiltonian meshed for restoration purpose.

17. A network planning tool for determining the minimum restoration capacity in a meshed transmission network, said tool comprising:

means for logically dividing said network into geographical sub-networks; and means for determining a Hamiltonian mesh for each sub-network in the network, said Hamiltonian mesh being a closed sequence of bi-directional links traversing each node of its corresponding sub-network mesh exactly once.

18. A network element in a meshed transmission network, said network element being part of a mesh being a closed sequence of bi-directional links traversing each node part of said mesh exactly once, part of the transmission capacity within said mesh being reserved for restoration purpose; said network element comprising:

means for routing during failure-free operation an idle signal along said mesh using said reserved capacity;

means for detecting a failure of a link terminated by said network element; and means for splitting traffic to be transmitted over the failed link into two portions and rerouting said two portions over the two directions of said mesh using said reserved capacity.

19. A network management device for configuring network elements of a meshed transmission network, said device comprising:

means for determining a mesh in the network, said mesh being a closed sequence of bi-directional links traversing each node part of said mesh exactly once;

means for configuring said network elements part of said mesh to reserve part of the transmission capacity within said mesh for restoration purpose; and means for routing during failure-free operation an idle signal along said mesh using said reserved capacity.

* * * * *